United States Patent
Wu et al.

(10) Patent No.: US 10,860,404 B2
(45) Date of Patent: Dec. 8, 2020

(54) SERVER AND DEBUGGING METHOD THEREFOR

(71) Applicant: MITAC COMPUTING TECHNOLOGY CORPORATION, Taoyuan (TW)

(72) Inventors: Yi-Hua Wu, Taoyuan (TW); I-Hsin Chen, Taoyuan (TW); Chung-Hsien Liu, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 172 days.

(21) Appl. No.: 16/260,965

(22) Filed: Jan. 29, 2019

(65) Prior Publication Data

US 2020/0064402 A1   Feb. 27, 2020

(30) Foreign Application Priority Data

Aug. 22, 2018   (TW) .............................. 107129365 A

(51) Int. Cl.
G06F 11/07   (2006.01)

(52) U.S. Cl.
CPC ...... *G06F 11/0772* (2013.01); *G06F 11/0709* (2013.01)

(58) Field of Classification Search
CPC ............. G06F 11/2221; G06F 11/2273; G06F 11/263; G06F 11/267; G06F 11/273
See application file for complete search history.

(56) References Cited

U.S. PATENT DOCUMENTS

| 8,806,086 B2 * | 8/2014 | Weng .................... G06F 13/385 710/38 |
| 9,378,074 B2 * | 6/2016 | Zhang ................... G06F 11/263 |
| 2013/0326278 A1 * | 12/2013 | Yin ..................... G06F 11/3656 714/38.1 |

FOREIGN PATENT DOCUMENTS

| CN | 103049410 A | 4/2013 |
| CN | 107678988 A | 2/2018 |
| TW | 201020767 A1 | 6/2010 |
| TW | 201341811 A | 10/2013 |

* cited by examiner

*Primary Examiner* — Joseph R Kudirka
(74) *Attorney, Agent, or Firm* — Rabin & Berdo, P.C.

(57) ABSTRACT

This application provides a server and a debugging method therefor. The debugging method for a server includes receiving, by a complex programmable logic device (CPLD), a control signal generated by a switching member, and generating a switching signal; and switching, by a bus switch, a communication connection of a communications port to a debug port or a Serial Over LAN port of a baseboard management controller (BMC) based on the switching signal. In this way, debugging work is completed or industrial control application information is received at the communications port.

20 Claims, 2 Drawing Sheets

S11  A complex programmable logic device receives a control signal generated by a switching member, and generates a switching signal S12  A bus switch switches a communication connection of a communications port to a debug port or a Serial Over Lan port of a baseboard management controller based on the switching signal S13  Perform debugging or receive industrial control application information by using the communications port

SERVER AND DEBUGGING METHOD THEREFOR

CROSS-REFERENCE TO RELATED APPLICATION

This non-provisional application claims priority under 35 U.S.C. § 119(a) to Patent Application No. 107129365 filed in Taiwan, R.O.C. on Aug. 22, 2018, the entire contents of which are hereby incorporated by reference.

BACKGROUND

Technical Field

The present invention relates to a server and a debugging method therefor, and in particular, to a server that can perform debugging outside a server casing and a debugging method therefor.

Related Art

Usually, a server includes a motherboard, and the motherboard further includes a basic input/output system (BIOS). The BIOS is configured to: initialize hardware of the server, manage hardware data, shield a platform feature, and boot an operating system, and is a communicating interface connecting basic hardware and system software of a computer. In addition, the BIOS has a capability of accessing and controlling computer hardware. Therefore, to perform debugging during a startup process, a debug jack is usually disposed on the motherboard. When wanting to perform debugging, a maintenance person needs to open a casing of the server, and receive debugging information by using the debug jack connected inside the casing, to perform debugging. However, this debugging manner requires the casing to be opened, and cannot deliver debugging work efficiency required by the maintenance person.

SUMMARY

The present invention provides a server and a debugging method therefor.

In an embodiment, a server includes a casing, a switching member, a complex programmable logic device (CPLD), a baseboard management controller (BMC), a debug jack, a communications port, and a bus switch. The switching member is disposed on an outer surface of the casing, and configured to generate a control signal. The CPLD is disposed inside the casing and coupled to the switching member, where the CPLD receives the control signal and generates a switching signal. The BMC is disposed inside the casing and coupled to the CPLD, where the BMC has a debug port and a Serial Over LAN (Local Area Network) port. The debug jack disposed inside the casing and coupled to the debug port of the BMC. The communications port is disposed on the outer surface of the casing and coupled to the BMC. The bus switch is disposed inside the casing and separately coupled to the CPLD, the debug port, the Serial Over LAN port, and the communications port, and configured to switch a communication connection of the communications port to one of the debug port and the Serial Over LAN port of the BMC based on the switching signal.

In an embodiment, the switching member is a button with the ID LED that is used to provide an ID LED function.

In an embodiment, the server further includes a universal asynchronous receiver/transmitter (UART), where the debug jack is coupled to the BMC by using the interface of UART.

In an embodiment, the communications port is an RS232 communications port.

In an embodiment, the CPLD, the BMC, the debug jack, and the bus switch are disposed on a motherboard.

In an embodiment, a debugging method for a server includes: receiving, by a CPLD, a control signal generated by a switching member, and generating a switching signal based on the control signal; and switching, by a bus switch, a communication connection of a communications port to either of a debug port and a Serial Over LAN port of a BMC based on the switching signal.

In an embodiment, the debug port of the BMC and a debug jack communicate with each other in a two-way manner, and the debug port of the BMC and the communications port communicate with each other in a two-way manner.

In an embodiment, the communications port and the Serial Over LAN port communicate with each other in a one-way manner, and the BMC outputs industrial control application information through the Serial Over LAN port.

In an embodiment, the CPLD determines that duration of the control signal generated by the switching member conforms to a particular time, and generates the switching signal based on a determining result.

In an embodiment, the debug port of the BMC is further in communication connection with a debug jack, the BMC transmits first debugging information to the debug jack by using the debug port, the BMC transmits second debugging information to the communications port, and the first debugging information is not totally the same as the second debugging information.

DETAILED DESCRIPTION

Figure 1:
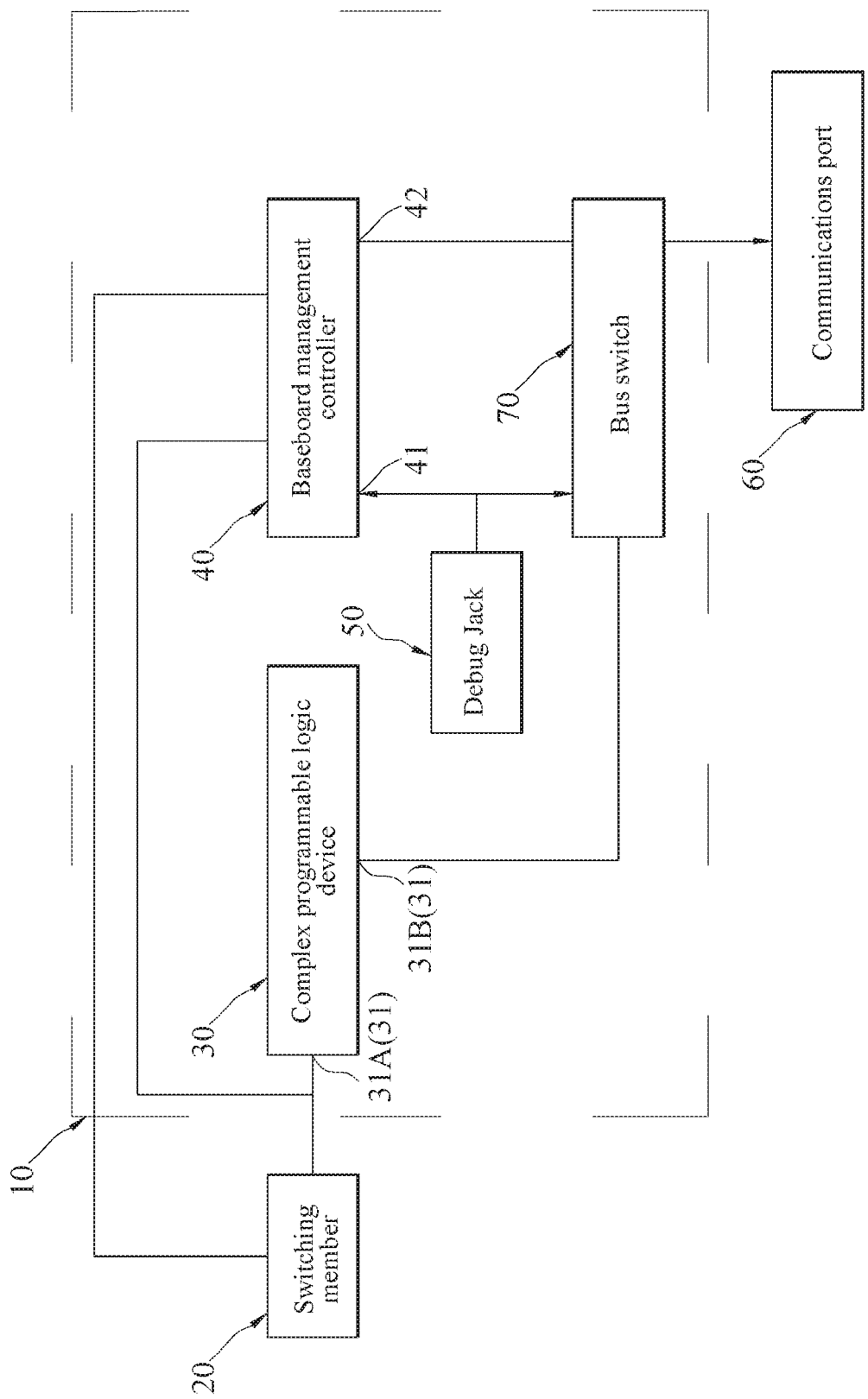
FIG. 1 is a schematic block diagram of an embodiment of a server according to the present invention.

Referring to FIG. 1, FIG. 1 is a schematic block diagram of an embodiment of a server according to the present invention. The server shown in FIG. 1 includes at least a casing 10, a switching member 20, a CPLD 30, a BMC 40, a debug jack 50, a communications port 60, and a bus switch 70. The switching member 20 and the communications port 60 are disposed on an outer surface of the casing 10, and the CPLD 30, the BMC 40, the debug jack 50, and the bus switch 70 are disposed inside the casing 10. In addition, the bus switch 70 is separately coupled to the CPLD 30, the BMC 40, the debug jack 50, and the communications port 60.

Further, in an embodiment, the BMC 40 includes a debug port 41 and a Serial Over LAN (Local Area Network) port 42, the bus switch 70 is separately coupled to the debug port 41 and the Serial Over LAN port 42 of the BMC 40, and the debug jack 50 is coupled to the debug port 41.

Herein, the switching member 20 on the outer surface of the casing 10 generates a control signal, the CPLD 30 receives the control signal transmitted by the switching member 20 on the outer surface of the casing 10 and generates a switching signal, and the bus switch 70 switch a communication connection of the communications port 60 to the debug port 41 or the Serial Over LAN port 42 of the BMC 40 based on the switching signal. In this way, debugging information output by the debug port 41 or industrial control application information output by the Serial Over LAN port 42 can be received by using the communications port 60 on the outer surface of the casing 10.

Referring to FIG. 1, in an embodiment, the CPLD 30, the BMC 40, the debug jack 50, and the bus switch 70 disposed inside the casing 10 are disposed on a motherboard, and are respectively electrically connected to each other by using traces on the motherboard. In another embodiment, the BMC 40 is designed on a baseboard management control adapter card, and herein the baseboard management control adapter card is inserted into an adapter card slot on the motherboard, to be electrically connected to the motherboard. However, the present invention is limited to the foregoing implementations.

In an embodiment, the switching member 20 is an existing component on the casing 10 of the server. In other words, the switching member 20 has an existing first function in the server, and the switching member 20 has a second function in this embodiment. Herein, the switching member 20 may include an ID LED function. In this embodiment, the server includes a plurality of switching members 20, and each switching member 20 respectively corresponds to a hard disk or an electronic apparatus of the server or corresponds to the motherboard of the server. Pressing the switching member 20 can control whether the ID LED of the switching member 20 emits light. For example, when the ID LED does not emit light, pressing the switching member 20 enables the ID LED to emit light; and when the ID LED is in a light-emitting state, pressing the switching member enables the ID LED to switch states to enter a non-light-emitting state. In this way, after a maintenance person of the server maintains or debugs the hard disk or the electronic apparatus in the server, the light-emitting state or the non-light-emitting state of the switching member 20 may be changed, to serve as a mark, so that the maintenance person of the server quickly observes a status of the maintenance or debugging of the hard disk or the electronic apparatus. Herein, a function of pressing the switching member 20 to change the light-emitting state or the non-light-emitting state of the switching member 20 is one of the function (the first function) of the switching member 20 in the server.

Figure 2:
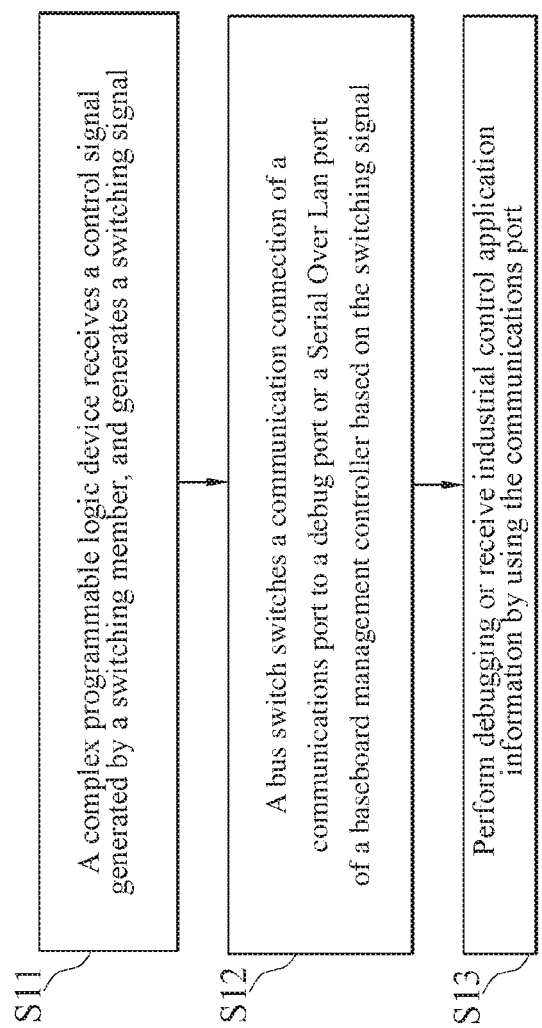
FIG. 2 is a flowchart of an embodiment of a debugging method for a server according to the present invention.

In this embodiment, referring to FIG. 2, the CPLD 30 receives a control signal generated by a switching member 20, and generates a switching signal (step S11). Specifically, when being pressed, the switching member 20 generates the control signal, and the CPLD 30 receives the control signal, and determines whether a continuous generation time of the control signal generated by the switching member 20 indicates that the switching member 20 is held down. In other words, when the switching member 20 is continuously pressed and hold for the continuous generation time, the switching member 20 continuously generates the control signal based on the continuous generation time, and the CPLD 30 receives the control signal and compares a particular time with the continuous generation time of the continuously generated control signal, to determine whether the switching member 20 is held down, and when the continuous generation time conforms to the particular time, determines that the switching member 20 is held down. In this case, the CPLD 30 generates the switching signal based on the determining result when determining that the switching member 20 is held down. When the continuous generation time does not conform to the particular time, the CPLD 30 determines that the switching member 20 is not held down, and does not generate the switching signal, and the switching member 20 switches between the light-emitting state and the non-light-emitting state of the ID LED based on the pressing whose duration is shorter than the particular time. Herein, the switching member 20 used in this application has two functions. In this embodiment, the CPLD 30 may determine whether the continuous generation time of the control signal continuously generated by the switching member 20 is equal to or longer than the particular time. For example, if the particular time is three seconds, a switching signal is generated when the continuous generation time of the control signal continuously generated by the switching member 20 is equal to three seconds.

Still referring to FIG. 1, in an embodiment, the CPLD 30 has a plurality of General Purpose Input/Output (GPIO) pins 31. Herein, the CPLD 30 includes at least a first GPIO pin 31A and a second GPIO pin 31B.

In an embodiment, the switching member 20 is coupled to the CPLD 30, the first GPIO pin 31A is configured to receive the control signal generated by the switching member 20, and the second GPIO pin 31B is configured to output a switching signal.

The BMC 40 is mainly configured to manage the server. Further, in a power-on procedure of the server, the BMC 40 may receive a startup detection signal of the motherboard, and may output, by using the debug port 41, debugging information having a hardware debug detection signal. In an embodiment, the debug port 41 of the BMC 40 is coupled to the debug jack 50 by using a UART. Herein, stable communication with the outside is performed by using features of a low voltage and a stable speed of the UART. In other words, the debugging information having the hardware debug detection signal can be stably output to the outside, and a programming signal input from the debug jack 50 can also be stably received. Specifically, the debug jack 50 located inside the casing 10 is in normal communication connection with the BMC 40, to normally provide the debugging information.

Further, the debug port 41 of the BMC 40 is a port that has a capability of two-way communication; and therefore can output the debugging information having the hardware debug detection signal, and can receive a programming signal output by an engineering person. The Serial Over LAN port 42 is a one-way port having only a signal output capability. In this embodiment, in cooperation with switching of the bus switch 70, the communications port 60 can transmit the programming signal that is output to the debug port 41 of the BMC 40 by using the communications port 60, and receive the debugging information that has the hardware debug detection signal and that is output by the debug port 41 by using the communications port 60, or receive the industrial control application information that is output by the Serial Over LAN port 42 by using the communications port 60, for example, receive the industrial control application information from the Serial Over LAN port 42, to output, by using the communications port 60, the industrial control application information to a bar code machine, a printer, a modem, a drawing machine, or a joystick apparatus that is connected to the communications port 60.

Based on the foregoing, when a user wants to perform debugging, the user only needs to continuously press and hold the switching member 20 for the particular time. The CPLD 30 determines whether the continuous generation time of the control signal continuously generated by the switching member 20 conforms to the particular time. When the CPLD 30 determines the continuous generation time of the control signal continuously generated by the switching member 20 being continuously pressed conforms to the particular time, the CPLD 30 generates the switching signal based on the determining result. The bus switch 70 switches a communication connection of the communications port 60 to either of the debug port 41 and Serial Over LAN port 42 of the BMC 40 based on the switching signal (step S12). In this way, the user can perform debugging or receive the industrial control application information by using the communications port 60 (step S13).

Specifically, through switching of the bus switch 70, the user can connect the communications port 60 to the debug port 41 of the BMC 40, to perform a debugging mode; in other words, receive, by using the communications port 60, the debugging information output by the BMC 40 from the debug port 41, and transmit, by using the communications port 60, the programming signal to the debug port 41 of the BMC 40. Alternatively, the user can perform switching of the bus switch 70 to connect the communications port 60 to the Serial Over LAN port 42 of the BMC 40, to perform a Serial Over LAN mode; in other words, receive, by using the communications port 60, the industrial control application information output from the Serial Over LAN port 42 of the BMC 40, and output the industrial control application information by using the communications port 60.

Specifically, when the switching member 20 is not continuously pressed for the particular time, the debug jack 50 is in communication connection with the BMC 40, and the user may receive the debugging information by using debug jack 50. After the switching member 20 is continuously pressed for the particular time, the CPLD 30 generates the switching signal, and the bus switch 70 switches the communication connection of communications port 60 to the debug port 41 of the BMC 40. In this way, the user can receive the debugging information by using the communications port 60 on the outer surface of casing 10, and can quickly and conveniently perform debugging without opening the casing 10. Further, for the overall server, because the user performs debugging without opening the casing 10, a probability that original precise wiring or cable run inside the casing 10 is damaged or changed is reduced, and stability of the server can be ensured.

Still further, in some embodiments, to control and manage content of the debugging information provided to a general user, the BMC 40 outputs first debugging information to the debug jack 50 by using the debug port 41; the BMC 40 outputs second debugging information to the communications port 60 by using the debug port 41; and the first debugging information is not totally the same as the second debugging information. In other words, most users of the communications port 60 located on the outer surface of the casing 10 are general consumers or users, and therefore the debugging information output by the BMC 40 to the communications port 60 is general information meeting requirements of the general consumers or users. Specifically, the debugging information output by the BMC 40 to the debug jack 50 by using the debug port 41 may include and be more than the debugging information output to the communications port 60, so that a high-order engineer or programmer can perform advanced error removal or programming.

In addition, the debugging information output by the BMC 40 by using the debug port 41 is also more than the industrial control application information output by the BMC 40 by using the Serial Over LAN port 42. Specifically, because the BMC 40 is responsible for monitoring and managing an operating status of the server, the BMC 40 can access many operation information and data of the server. Herein, the industrial control application information and the debugging information are both from the BMC 40. However, the Serial Over LAN port 42 is a one-way port that has only a signal output capability, and therefore the industrial control application information output by the BMC 40 by using the Serial Over LAN port 42 has particular and limited content.

The debug port 41 is a port that has a capability of two-way communication. Therefore, information output by the BMC 40 by using the debug port 41 may be preset information, or may be other non-preset information requested from the BMC 40 by using a programming signal. Therefore, the debugging information output by the BMC 40 by using the debug port 41 is more than the industrial control application information output by the BMC 40 by using the Serial Over LAN port 42.

Further, in this embodiment, that the debugging information of the BMC 40 is output to the debug jack 50 or the communications port 60 by using the debug port 41 is not determined by the BMC 40, but is determined based on switching of the bus switch 70.

Therefore, to enable the BMC 40 to output the debugging information to the debug jack 51 or the communications port 60 and determine that partially locked/limited/annotated data cannot be transmitted by using the communications port 60, in this embodiment, the BMC 40 may determine whether the bus switch 70 switches the communication connection of the communications port 60 to the debug port 41 of the BMC 40. Specifically, the BMC 40 obtains the same switching signal based on which the bus switch 70 switches the communication connection of the communications port 60, so that the BMC 40 can determine whether the bus switch 70 switches the communication connection of the communications port 60 to the debug port 41 of the BMC 40, to determine, based on the determining result, that the partially locked/limited/annotated data cannot be transmitted by using the debug port 41. In other words, when determining that the bus switch 70 switches the communication connection of the communications port 60 to the debug port 41 of the BMC 40, the BMC 40 locks the partially locked/limited/annotated data, so that the partially locked/limited/annotated data cannot be transmitted by using the debug port 41, and prevents the partially locked/limited/annotated data from being transmitted by using the communications port 60.

In an embodiment, the BMC 40 also has a timer. Therefore, when determining whether the switching member 20 is held down, the CPLD 30 may first determine whether the switching member 20 is held down and then simultaneously transmit or bypass the switching signal to the bus switch 70 and the BMC 40. In this way, the BMC 40 can obtain the switching signal the same as that of the bus switch 70, and then can determine whether the bus switch 70 switches the communication connection to connect the communications port 60 to the debug port 41.

In another embodiment, the BMC 40 may directly perform the determining. Herein, the switching member 20 simultaneously outputs the control signal to the CPLD 30 and the BMC 40, and the CPLD 30 and the BMC 40 separately determine whether the continuous generation time of the control signal conforms to the particular time, and generate the same switching signal based on the determining result. In this way, the BMC 40 can obtain the switching signal the same as that transmitted by the CPLD 30 to the bus switch 70, and then can determine whether the bus switch 70 switches the communication connection to connect the communications port 60 to the debug port 41.

It should be noted that, the CPLD 30 controls a power-on timing sequence of electronic components in the server, and therefore the CPLD 30 is in an operational state when the server is in a stand-by state (where, a startup procedure such as the booting procedure and the POST procedure has not completed). In this way, when the server is in the stand-by state, pressing the switching member 20 can also generate the control signal, and in this state, the CPLD 30 may determine whether the control signal is consistent with expectations, to generate the switching signal.

Therefore, usually in the startup procedure of the server, the BMC 40 is first started, and after the BMC 40 is normally started, a BIOS is started, to start an overall operating system. In this way, if the server needs to be debugged after the BMC 40 normally operates and before the BIOS is started, the CPLD 30 may already determine whether the control signal is consistent with expectations, to generate the switching signal, and therefore, in this state, the communication connection of BMC 40 can also be switched to connect to the communications port 60 by using the switching member 20, so that the user receives the debugging information from the communications port 60 on the outer surface of the casing 10.

It can be learned from this that, in the foregoing embodiments, a timing sequence of debugging work may be earlier, to be specific, after the BMC 40 normally operates and before the POST procedure is executed. Different detection requirements can be satisfied. In addition, because the BIOS is not run, restart is not needed after the debugging work, so that debugging efficiency can be further increased.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A server, comprising:
   a casing;
   a switching member, disposed on an outer surface of the casing, and configured to generate a control signal;
   a complex programmable logic device (CPLD), disposed inside the casing and coupled to the switching member, wherein the CPLD receives the control signal and generates a switching signal;
   a baseboard management controller (BMC), disposed inside the casing and coupled to the CPLD, wherein the BMC has a debug port and a Serial Over LAN (Local Area Network) port;
   a debug jack, disposed inside the casing and coupled to the debug port of the BMC;
   a communications port, disposed on the outer surface of the casing and coupled to the BMC; and
   a bus switch, disposed inside the casing and separately coupled to the CPLD, the debug port, the Serial Over LAN port, and the communications port, and configured to switch a communication connection of the communications port to the debug port or the Serial Over LAN port of the BMC based on the switching signal.

2. The server according to claim 1, wherein the switching member is a button with an ID LED.

3. The server according to claim 2, further comprising a plurality of switching members, and each switching member respectively corresponds to a hard disk, an electronic apparatus, or a motherboard of the server.

4. The server according to claim 1, further comprising a universal asynchronous receiver/transmitter (UART), wherein the debug jack is coupled to the BMC by using the UART.

5. The server according to claim 1, wherein the communications port is an RS232 communications port.

6. The server according to claim 1, wherein the CPLD, the BMC, the debug jack, and the bus switch are disposed on a motherboard.

7. The server according to claim 6, wherein the BMC is a baseboard management adapter card, and the baseboard management adapter card is inserted into an adapter card slot of the motherboard.

8. The server according to claim 1, wherein the CPLD comprises a first GPIO (General Purpose Input/Output) pin and a second GPIO pin, the first GPIO pin receives the control signal, and the second GPIO pin outputs the switching signal.

9. A debugging method for a server, comprising:
   receiving, by a complex programmable logic device (CPLD), a control signal generated by a switching member, and generating a switching signal based on the control signal; and
   switching, by a bus switch, a communication connection of a communications port to either of a debug port and a Serial Over LAN (Local Area Network) port of a baseboard management controller (BMC) based on the switching signal.

10. The debugging method for a server according to claim 9, wherein the debug port of the BMC and a debug jack communicate with each other in a two-way manner, and the debug port of the BMC and the communications port communicate with each other in a two-way manner.

11. The debugging method for a server according to claim 10, wherein the debug jack is in normal communication connection with the BMC.

12. The debugging method for a server according to claim 9, wherein the communications port and the Serial Over LAN port communicate with each other in a one-way manner, and the BMC outputs information to the Serial Over LAN port.

13. The debugging method for a server according to claim 9, wherein the debug port of the BMC outputs debugging information, the Serial Over LAN port of the BMC outputs industrial control application information, and the debugging information is more than the industrial control application information.

14. The debugging method for a server according to claim 9, wherein the CPLD determines that a duration of the control signal generated by the switching member conforms to a particular time, and generates the switching signal based on a determining result.

15. The debugging method for a server according to claim 14, wherein when the CPLD determines that the duration of the control signal generated by the switching member does not conform to a particular time, a light emitting status of an ID LED of the switching member is changed.

16. The debugging method for a server according to claim 9, wherein when the CPLD determines that a duration of the control signal generated by the switching member does not conform to a particular time, a light emitting status of an ID LED of the switching member is changed.

17. The debugging method for a server according to claim 9, wherein the debug port of the BMC is further in communication connection with a debug jack, the BMC transmits first debugging information to the debug jack, the BMC transmits second debugging information to the communications port, and the first debugging information is not totally the same as the second debugging information.

18. The debugging method for a server according to claim 9, wherein the BMC further has a timer, and the CPLD simultaneously transmits the switching signal to the bus switch and the BMC.

19. The debugging method for a server according to claim 9, wherein the switching member simultaneously transmits the control signal to the CPLD and the BMC, and the CPLD and the BMC respectively determine whether a continuous generation time of the control signal conforms to a particular time.

20. The debugging method for a server according to claim 9, wherein when being pressed, the switching member generates the control signal.

\* \* \* \* \*